Aug. 2, 1960
H. M. STRONG
2,947,609
DIAMOND SYNTHESIS
Filed Jan. 6, 1958
2 Sheets-Sheet 2
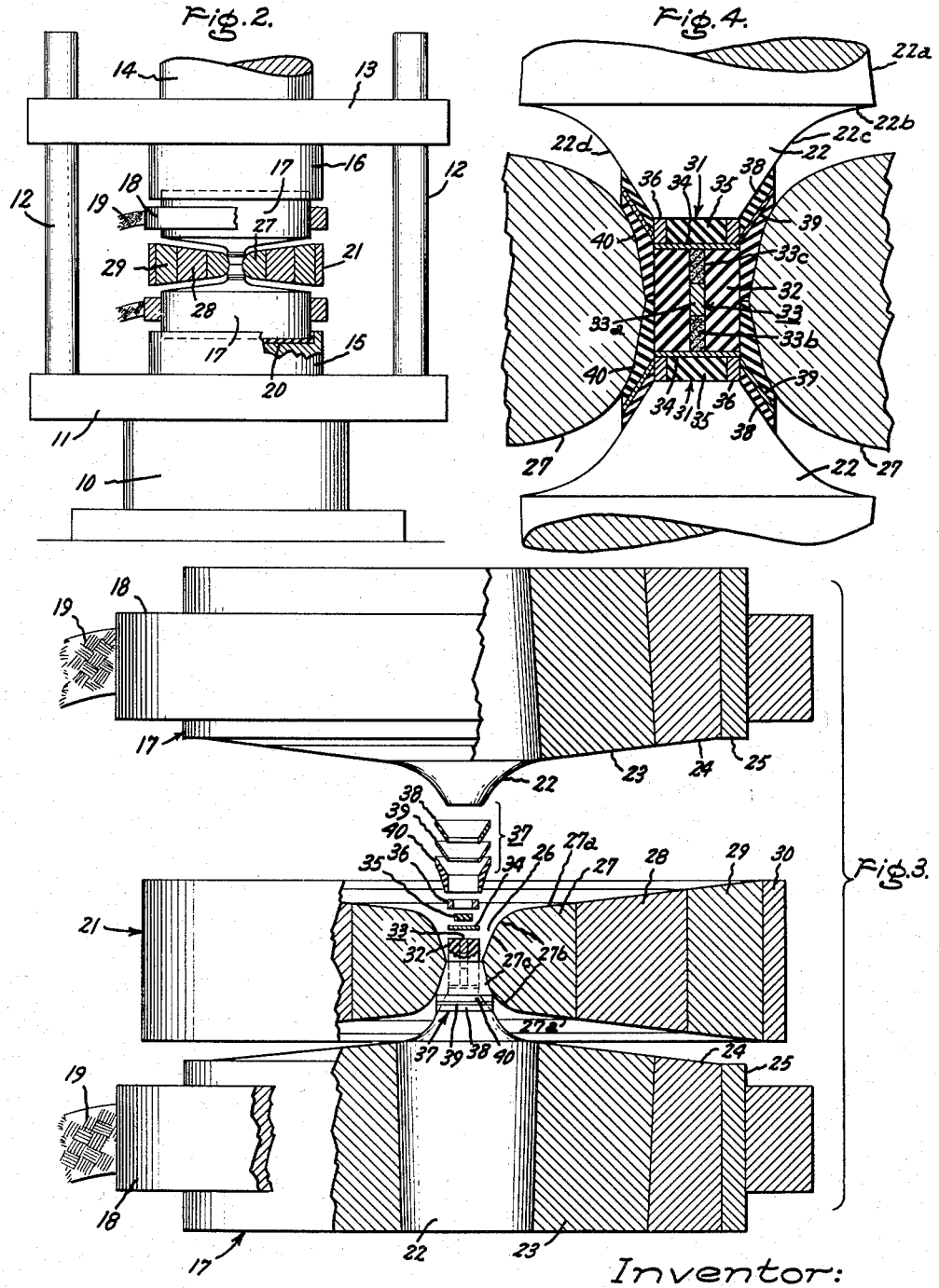
Inventor:
Herbert M. Strong,
by Paul A. Frank
His Attorney.

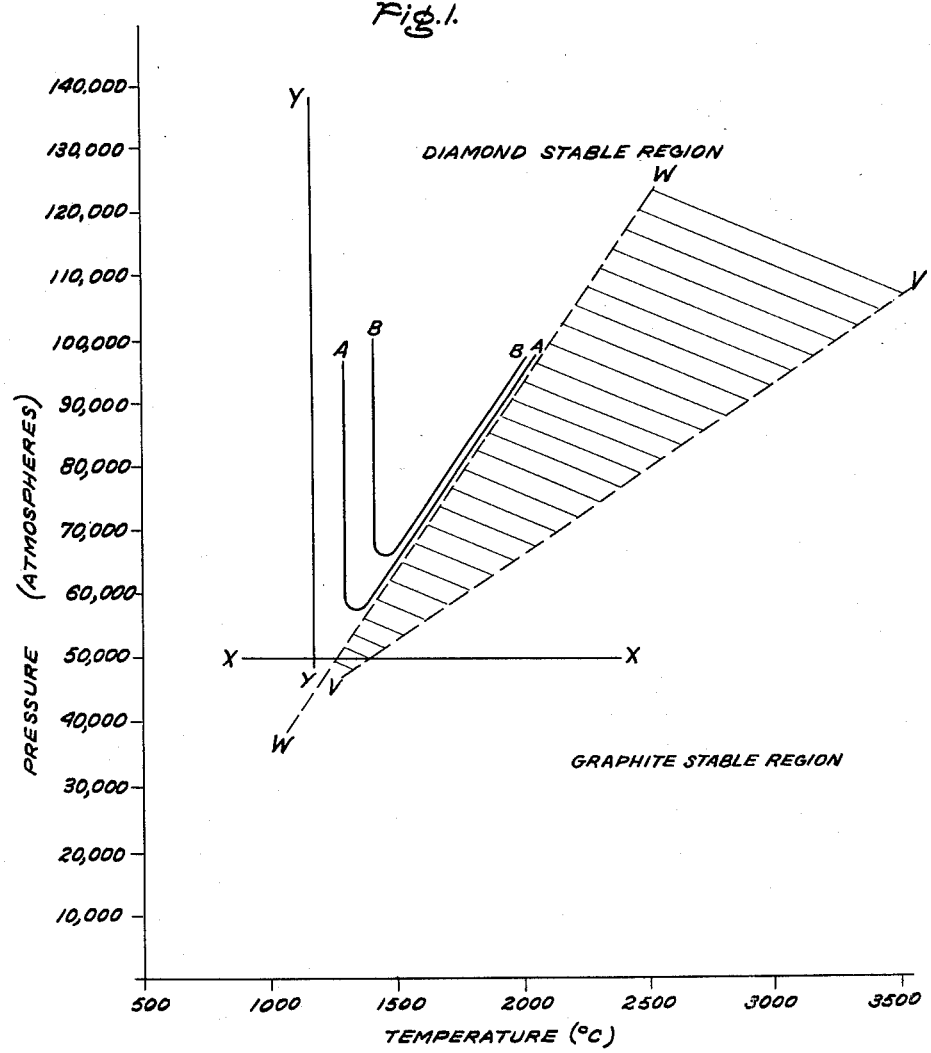

United States Patent Office 2,947,609
Patented Aug. 2, 1960

2,947,609

DIAMOND SYNTHESIS

Herbert M. Strong, Schenectady, N.Y., assignor to General Electric Company, a corporation of New York Filed Jan. 6, 1958, Ser. No. 707,433

12 Claims. (Cl. 23—209.1)

This application is a continuation-in-part of my copending application Serial No. 655,885, filed April 29, 1957, and now abandoned, and assigned to the same assignee as the present invention.

This invention relates to a method for the conversion of carbonaceous materials to diamond.

In the past, a great deal of effort has been expended in attempts to convert more abundant and less expensive forms of carbon into the diamond form. In connection with these efforts, a great deal of attention has been directed towards speculation as to the method by which diamond is formed in nature. However, no satisfactory explanation of the natural process by which diamond has been formed has ever been given and it is unlikely that the natural process of diamond formation will be understood in the near future.

The need for a readily available source of diamond has arisen because of its increasing usage and the very few known sources of diamond in the world at present. Attempts to prepare diamonds from less expensive forms of carbon in the past, have generally taken the form of attempts to apply heat and pressure to amorphous carbon or graphite to cause a transformation from one allotropic form to another. Attempts have also been made to convert other forms of carbon to diamond by catalytic transformations using various metals and salts as the transformation catalyst.

In the copending applications of H. T. Hall, H. M. Strong and R. H. Wentorf, Serial No. 633,505, filed January 10, 1957, and now abandoned, and Serial No. 707,435, filed concurrently and assigned to the same assignee as the present invention, there is described a method of making diamond which comprises subjecting non-diamond carbon to a pressure of at least 75,000 atmospheres and a temperature of from 1200–2000° C. in the presence of a metal selected from the class consisting of iron, cobalt, nickel, rhodium, ruthenium, palladium, osmium, iridium, chromium, tantalum and manganese. In the copending application of F. P. Bundy, Serial No. 655,884, filed April 29, 1957, and now abandoned, and assigned to the same assignee as the present invention, there is described a method of converting carbonaceous materials to diamond at a pressure of at least 90,000 atmospheres in the presence of platinum. Although the methods of these aforementioned copending applications are satisfactory for converting carbonaceous materials, such as graphite, to diamond, the process of these applications are somewhat deficient in that relatively high pressures, i.e. pressures of at least about 75,000 atmospheres are required.

In the synthesis of diamonds from carbonaceous materials it is desirable to provide methods which can utilize pressures below 75,000 atmospheres so as to reduce the wear on the apparatus employed in the synthesis.

It is an object of the present invention to provide a method whereby carbonaceous materials may be converted to diamonds at pressures lower than pressures heretofore demonstrated useful in such methods.

A further object of the present invention is to provide a method for the conversion of carbonaceous material to diamond at pressures as low as 50,000 atmospheres.

These and other objects of my invention are accomplished by subjecting a carbonaceous material to an elevated pressure and an elevated temperature in the presence of a catalyst operative above certain minimums of pressure and temperature in the diamond stable region to catalyze the diamond forming reaction. The pressure and temperature of the reaction are selected to be in the range in which the particular catalyst is operative. The catalyst comprises a preformed alloy of at least two metals, one of which is a member selected from the class consisting of group VIII metals of the periodic table, chromium, tantalum, and manganese. In general, the process of this invention is carried out at pressures of from about 50,000 to about 115,000 atmospheres and temperatures of from about 1200° C. to about 2600° C.

This invention may be best understood by reference to the following description taken in connection with the drawings in which:

Fig. 1 is a pressure-temperature phase diagram for carbon;

Fig. 2 is a front elevational view, partly in section, of a hydraulic press with a high pressure high temperature apparatus which may be employed in practicing this invention;

Fig. 3 is an enlarged, partially exploded sectional view of the high pressure high temperature apparatus of Fig. 2; and Fig. 4 is an enlarged, sectional view of a portion of the high temperature high pressure apparatus of Figs. 2 and 3.

Theoretical and experimental workers in the field of attempted diamond synthesis have long postulated that a thermodynamic pressure-temperature equilibrium line exists between diamond and non-diamond carbon. This equilibrium line is discussed by Bridgman, Journal of Chemical Physics, 15, 92–98 (1947), and in the papers cited therein. One of the most recent diamond-graphite equilibrium lines is the one proposed by Berman and Simon, Zeit. f. Elektrochemie, 59, 355 (1955). These workers have postulated that by compressing carbon at a pressure and temperature in the diamond stable region of the carbon phase diagram, the conversion of non-diamond carbon to diamond will occur. However, none of the workers in the field have been able to accomplish this conversion. It has now been established that there are both diamond stable regions and non-diamond carbon stable regions in the carbon pressure-temperature phase diagram. But contrary to the theories of previous workers, it has been found that merely subjecting non-diamond carbon to conditions such that the non-diamond carbon is in the diamond stable region of the phase diagram is not enough to convert non-diamond carbon to diamond. The aforementioned Hall et al. applications are based on the discovery that in certain portions of the diamond stable region of the carbon phase diagram and in the presence of certain selected catalysts the conversion of carbonaceous material to diamond could be readily and reproducibly accomplished. However, the discovery of the Hall et al. applications was limited to catalysts which were operative in the diamond stable regions only above a pressure of at least about 75,000 atmospheres. Employing the catalysts of the present invention, it is possible to readily and reproducibly accomplish the conversion of carbonaceous material to diamond at pressures as low as about 50,000 atmospheres.

Throughout this application the term "diamond stable region" will be used to describe the conditions of pressure and temperature at which carbonaceous material theoretically can be converted to diamond. This phrase is best understood by reference to Fig. 1 which is a plot of temperature in degrees centigrade as abscissa against pressure in atmospheres as the ordinate. The shaded area in the drawing between dashed line VV and dashed line WW represents an equilibrium zone or a zone whose limits cannot be determined with complete precision between conditions of pressure and temperature at which diamond is the stable form of carbon and conditions of pressure and temperature at which graphite is the stable form of carbon. For purposes of the present application the shaded area will be considered to represent the actual equilibrium zone, although further experimental work may indicate that the location and shape of this zone may be somewhat different from that indicated in the drawing.

The diamond stable region is represented by those conditions of pressure and temperature in or above the equilibrium zone in the drawing. The graphite stable region is represented by those conditions of pressure and temperature in or below the equilibrium zone in the drawing. Thus, when pure diamond is subjected to pressure and temperature conditions in the diamond stable region, the diamond will not convert to graphite. Similarly, when pure graphite is maintained under pressure and temperature conditions in the graphite stable region, the graphite will not convert to diamond.

The line XX in the drawing indicates the lower range of pressure (about 50,000 atmospheres) and the line YY indicates the lower range of temperature (about 1200° C.) at which non-diamond carbon is convertible to diamond by the process of the present invention. However, it should be understood that carbonaceous materials will not be converted to diamond by merely maintaining them in the diamond stable region at pressures and temperatures above the minimums defined by the lines XX and YY in the drawing. Graphite and other carbonaceous materials can be maintained at these pressures and temperatures for an indefinite period of time without any conversion. It is only when carbonaceous materials are subjected to the proper conditions of pressure and temperature in the presence of particular catalysts according to the present invention that the conversion to diamond takes place.

For purposes of illustrating the present invention, detailed examples of the conversion of graphite to diamond will be set forth below, principally because graphite is the most convenient starting material for diamond synthesis. However, it should be understood that carbonaceous materials other than graphite are convertible to diamond. Thus, the process of the present invention is applicable to amorphous carbon, coal, coke, charcoal, etc. In addition, the process of the present invention is applicable to materials which contain chemically bound carbon. This type of material includes carbon-containing organic and inorganic compounds of known structure and composition, as well as organic materials of indeterminate specific composition. Illustrative examples of carbonaceous materials of various types that are operative in this invention and which contain chemically bound carbon, include such unrelated materials as coal tar pitch, wood, paper, lithium carbide and naphthalene. Although this process is applicable to the conversion of chemically combined carbon to diamond, it is not assumed that the chemically combined carbon is converted directly to diamond. It is believed that chemically combined carbon is first decomposed into free carbon under the pressure and temperature of the reaction and this free carbon is then converted to diamond.

The preformed alloys employed as catalysts in the present invention have been described as being an alloy of at least two metals with one of the metals being selected from the class consisting of group VIII metals of the periodic table, chromium, tantalum and manganese. It should be noted that the group of metals specifically enumerated above are the same metals which are taught as catalysts in the aforementioned Hall et al. applications or the aforementioned Bundy application. This enumerated group of metals will be sometimes referred to hereinafter as "catalyst metals." The distinction between the aforementioned applications and the present application is that the catalyst metals are in the form of preformed alloys with at least one other metal.

The term "preformed alloy" is intended to mean a material formed of more than one metal in which the atoms of each metal are intimately associated with the atoms of every other metal and the atoms of each of the metals are held to the atoms of the other metals by metallic binding. This phrase is intended to distinguish the preformed alloys employed in the present invention from mere mechanical mixtures of particles of two or more pure metals. The type of preformed alloy which is within the scope of the present invention may vary within extremely wide limits. Thus, preformed alloys within the scope of the present invention include alloys of a catalyst metal and a non-catalyst metal, alloys of a catalyst metal and two or more non-catalyst metals, or alloys of two or more catalyst metals and two or more non-catalyst metals. Although the exact reason for the superiority of preformed alloys over pure catalyst metals is not fully understood, it is believed that this superiority is due at least in part to the fact that many of the alloys containing two or more metals, one of which is a catalyst metal, have melting points lower than the melting points of pure catalyst metals or mixtures of metals containing at least one catalyst metal. It is believed further that the transformation of carbonaceous material to diamond is facilitated by the melting of the preformed alloy at lower conditions of pressure and temperature than of the pure catalyst metal. This in turn allows the conversion of non-diamond carbon to diamond under less severe condition of pressure and temperature than is possible using a pure catalyst metal or mixture of metals containing a pure catalyst metal. This belief is further supported by the fact that lower conditions of pressure and temperature may be used in the conversion of carbonaceous material to diamond when the preformed alloy has a lower melting point at atmospheric pressure than the melting point of the corresponding catalyst metal which is a component of the alloy.

Another reason for the superiority of preformed alloys over pure catalyst metals is believed to be due to a nucleation effect provided by the alloys which permits diamonds to form at lower conditions of pressure with the preformed alloy than with the pure metal catalyst, and at the same time results in increased conversions of carbonaceous material to diamond, particularly at pressures and temperatures near the threshold of the diamond stable region.

The composition of the alloys of the present invention is limited only by the fact that two metals must be present, one of which is a catalyst metal. Generally, each of the components of the preformed alloy is present in an amount equal to 2 percent or more and preferably 10 percent or more, by weight, based on the total weight of the preformed alloy.

From the foregoing remarks it is seen that the preformed alloys of the present invention include alloys such as nickel-chromium, iron-manganese, iron-nickel, iron-cobalt, iron-nickel-cobalt, aluminum-nickel-cobalt, iron-iridium, iron-palladium, iron-platinum, iron-rubidium, iron-rhodium, iron-ruthenium, iron-antimony, iron-tin, iron-titanium, iron-vanadium, iron-tungsten, iron-zinc, iridium-platinum, magnesium-manganese, nickel-magnesium, manganese-palladium, manganese-platinum, molybdenum-nickel, nickel-palladium, nickel-platinum, nickel-tantalum, nickel-tin, nickel-titanium, nickel-tungsten, nickel-zinc, platinum-rhodium, silver-nickel, silver-palladium, silver-platinum, aluminum-cobalt, aluminum-chromium, aluminum-iron, aluminum-manganese, gold-iron, gold-nickel, gold-palladium, gold-platinum, bismuth-iron, cobalt-copper, cobalt-iron, cobalt-nickel, cobalt-platinum, cobalt-tungsten, chromium-iron, chromium-molybdenum, chromium-palladium, chromium-platinum, chromium-tungsten, copper-iron, copper-manganese, copper-nickel, copper-palladium, silver-copper-palladium, aluminum-copper-nickel, aluminum-iron-nickel, aluminum - magnesium - manganese, beryllium-copper-nickel, chromium-iron-nickel, copper-manganese-tin, copper-nickel-tin, copper-nickel-zinc, iron-molybdenum-nickel, iron-nickel-titanium, magnesium-manganese-zinc, iron-nickel-tungsten, etc. Among the specific alloys which have been particularly useful in the practice of the present invention may be mentioned, for example, 80 percent nickel–20 percent chromium, 95 percent nickel–5 percent chromium, 40 percent nickel–60 percent manganese, 50 percent iron–50 percent manganese, 70 percent iron–30 percent nickel, 40 percent nickel–60 percent copper, 50 percent nickel–50 percent copper, 66 percent iron–30 percent nickel–4 percent chromium, etc.

The preformed alloy catalysts of the present invention have been described as operative above certain minimums of pressure and temperature in the diamond stable region to catalyze the diamond forming reaction. Generally, the minimums of pressure and temperature are 50,000 atmospheres and 1200° C., respectively. This does not mean that all of the preformed alloy catalysts are operative at all pressures and temperatures in the diamond stable region above the 50,000 atmosphere and 1200° C. minimums. To understand more clearly the operativeness of the catalysts within the diamond stable region, reference is again made to Fig. 1. The curved lines designated by AA and BB in the drawing indicate for two particular preformed alloy catalysts the approximate minimums of pressure and temperature and the general area of the diamond stable region in which these catalysts have been shown to be effective in the conversion of carbonaceous material to diamond. As indicated by the curves AA and BB there appears to be no maximum pressure limit at which a given catalyst is operative in the invention. However, the curves indicate to a varying degree, maximum temperature limitations within which the diamond forming reaction may take place. While as a practical matter economics would dictate the use of temperatures and pressures not too far above the indicated minimums, it is evident from Fig. 1 that there is ample pressure and temperature range within which the best mode of carrying out the invention can be practiced.

The curve AA defines the approximate minimum of pressure and temperature and also indicates the general area in which a preformed alloy of 66 percent iron, 30 percent nickel, and 4 percent chromium catalyzes the conversion of graphite to diamond. The curve BB defines in a similar way these minimums of pressure and temperature and a general area for an 80 percent nickel–20 percent chromium alloy.

Thus, curves AA and BB indicate that there is a certain minimum pressure and temperature below which each particular catalyst is inoperative in the process of the present invention. For example, the minimum pressure at which a 66 percent iron, 30 percent nickel, 4 percent chromium catalyst is operative appears to be about 55,000 atmospheres. For an 80 percent nickel–20 percent chromium alloy the minimum pressure appears to the about 63,000 atmospheres.

The curves AA and BB of Fig. 1 are typical of the corresponding curves for many other preformed alloy catalysts which may be employed, although as will be evident, operative ranges will be different for each particular catalyst. The table below lists a number of the catalysts of the present invention and illustrates the approximate pressure range and approximate temperature range at which each of these catalysts has been found to be effective in the conversion of graphite to diamond.

| Catalyst | Approximate Pressure Range, Atmospheres | Approximate Temperature Range, ° C. |
|---|---|---|
| 80% Ni—20% Cr | 63,000–100,000 | 1,400–2,200 |
| 95% Ni—5% Cr | 65,000–90,000 | 1,500–1,600 |
| 40% Ni—60% Mn | 70,000–100,000 | 1,300–1,600 |
| 70% Fe—30% Ni | 63,000–90,000 | 1,300–1,700 |
| 50% Cu—50% Mn | 75,000–92,000 | 1,200–1,700 |

In the preferred embodiment of the present invention, the reaction is carried out at a pressure of from about 50,000 to about 110,000 atmospheres or more and temperatures of from about 1200–2600° C. or higher, said pressures and temperatures being selected to be within the range in which the particular catalyst employed is operative. A particularly useful range of pressure is from about 70,000 to about 100,000 atmospheres with a temperature of from about 1400 and 1800° C., the pressure and temperature at which the reaction is carried out again being selected for the particular catalyst employed.

Although the exact mechanism of the process of the present invention is not fully understood, it is believed that with all of the preformed alloy catalysts of the present invention a requirement of the process is that the pressure and temperature of the reaction must be selected so that the preformed alloy catalyst is in the liquid state. Thus, with all of the preformed alloy catalysts of the present invention all conversions of carbonaceous material to diamond have occurred while the catalyst has been in the liquid state. It is further believed that the most efficient conditions for the conversion of carbonaceous material to diamond occur above the melting point of the particular preformed alloy catalyst being employed, preferably about 50° C. to 300° C. above the melting point. Thus, when employing an 80 percent nickel-20 percent chromium alloy as a catalyst and with a pressure of about 95,000 atmospheres, the alloy appears to melt at a temperature slightly below 1350° C. in the presence of graphite. Therefore, with this particular alloy as a catalyst I prefer to carry out the reaction at a temperature of about 1400° C. to about 1650° C.

In the table below are listed the approximate melting points of an illustrative number of catalysts of the present invention at a pressure of about 95,000 atmospheres with the catalyst in contact with graphite. The melting points of these preformed alloy catalysts vary to some extent with pressure, increasing as the pressure increases. Generally, however, the change in melting point amounts to only from 0.5 to 2° C. per thousand atmospheres.

| Catalyst | Approximate Melting Point, ° C. |
|---|---|
| 80% Ni—20% Cr | 1,350 |
| 95% Ni—5% Cr | 1,400 |
| 70% Fe—30% Ni | 1,250 |
| 40% Ni—60% Mn | 1,200 |
| 50% Ni—50% Cu | 1,250 |
| 50% Cu—50% Mn | 1,100 |

It has been found that the proportions of the preformed alloy catalyst and the carbonaceous material employed in the practice of the present invention may be varied within extremely wide limits, for example, from 0.1 to 10 parts by volume of catalyst per part of carbonaceous material. However, it is preferred to have from about 0.5 to 2 parts by volume of catalyst per part of carbonaceous material.

In carrying out the process of the present invention, the preformed alloy catalyst and the carbonaceous material are brought into contact and heated to the desired pressure and temperature and kept under these reaction conditions until reaction has been effected. The time required for the reaction is extremely short and in almost all cases, the conversion is completed within from 1 to 2 seconds to a few minutes. In general, a time of about 2 to 4 minutes at the conversion pressure and temperature is allowed so as to assure complete conversion. No product disadvantage has been observed in exposing the reactants to high pressure and high temperature for extended periods of time.

In carrying out the process of the present invention, any apparatus capable of producing the pressures required at the temperatures required is satisfactory, since the invention is obviously not dependent upon any particular type of apparatus. One suitable type of apparatus for carrying out the present invention is the apparatus described and claimed in the copending applications of H. T. Hall, Serial No. 488,050, filed February 14, 1955, now abandoned, and Serial No. 707,432, filed concurrent herewith, now U.S. Patent No. 2,941,248, issued June 21, 1960, both assigned to the same assignee as the present invention. For purposes of the present application this apparatus is succinctly described by reference to Figs. 2 to 4.

This apparatus defines a reaction zone of controllable dimensions in which controllable temperatures and pressures may be obtained and maintained for desired periods of time. The disclosure of these Hall applications is hereby incorporated by reference into the present application. The apparatus disclosed in the aforementioned Hall applications is a high pressure device for insertion between the platens of a hydraulic press. The high pressure device consists of an annular member defining a substantially cylindrical reaction area, and two conical piston-type members or punches designed to fit into the substantially cylindrical portion of the annular member from either side of said annular member. A reaction vessel which fits into the annular member may be compressed by the two piston members to reach the pressures required in the practice of the present invention. The temperature required is obtained by any suitable means, such as, for example, by induction heating, by passing an electrical current (either alternating or direct) through the reaction vessel, or by winding heating coils around the reaction vessel.

Figs. 2 to 4 illustrate a specific apparatus which has been successfully employed for maintaining the sustained pressures and temperatures required for the practice of the present invention. In Fig. 2 of the drawing a hydraulic press capable of applying a force of 450 tons comprises a base 10 with a press bed 11 on which are mounted a plurality of vertical shafts 12 to support a movable carriage 13 with a hydraulic shaft 14. A pair of opposed recessed pistons 15 and 16 formed of hard steel on bed 11 and carriage 13 are recessed to partially position punch assemblies 17 therein, each of which punch assembly is provided with an electrical connection in the form of an annular copper conducting ring 18 with a connector 19 to supply electric current from a source of power (not shown) through assemblies 17 to the high temperature-high pressure reaction vessel which is described below. A layer of electrical insulation (laminated phenol formaldehyde impregnated paper) 20 is provided between lower punch assembly 17 and its associated piston 15 to prevent conduction of electrical current through the press. A lateral pressure resisting assembly or belt 21 is positioned between opposed assemblies 17 to provide a multistaging pressure effect.

In Fig. 3 is shown a partially exploded view, partly in section, of the punch assemblies 17 and the lateral pressure resisting assembly 21 of Fig. 2. To facilitate the practice of the present invention by persons skilled in the art, Fig. 3 is drawn to scale with each element of the drawing proportional to its actual size and shape in the specific apparatus successfully employed. In Fig. 3 the outside diameter of punch assemblies 17 is equal to 6 inches. Each punch assembly 17 comprises a punch 22 with surrounding binding rings 23 and 24 with a soft carbon steel safety ring 25 located around binding ring 24. Punch 22 is formed of Carboloy grade 44A cemented carbide which comprises 94 percent tungsten carbide and 6 percent cobalt. This material is more completely described in the publication "Properties of Carboloy Cemented Carbides," April 2, 1951, issued by Carboloy Department, General Electric Company, Detroit, Michigan. Binding rings 23 and 24 are formed of AISI 4142 alloy steel, commercially available, and comprising, by weight, 0.4 to 0.5 percent carbon, 0.71 to 1 percent manganese, 0.4 percent phosphorus, 0.4 percent sulfur, 0.2 to 0.35 percent silicon, 0.8 to 1.1 percent chromium, and 0.15 to 0.25 percent molybdenum. Binding ring 23 is hardened to 50 Rockwell C and binding ring 24 is hardened to a Rockwell C hardness of 40. It is seen from Fig. 3 that the members of punch assembly 17 are slightly tapered on their sides. This taper is employed so as to provide a force fit so that punch 22 is under high compression in the punch assembly. Assembly of these elements is accomplished by first forcing ring 24 into safety ring 25 in a suitable press and subsequently forcing ring 23 into binding ring 24. Finally punch 22 is forced into ring 23.

As is best shown in Fig. 4, which is a scale drawing with the faces 31 of punches 22 having a diameter of 0.350 inch, each punch 22 has a generally cylindrical portion 22a having a diameter of about 1.5 inches and a height of about 2.07 inches. Each punch 22a has a tapered portion having a vertical height of about 0.47 inch which comprises a first frustoconical portion 22b at an angle of about 7° from the horizontal, a curved portion 22c, and a second frustoconical portion 22d which has a slant length of about 0.25 inch and extends at an angle of about 30° from the vertical. Binding ring 23 has an outside diameter of about 3.9 inches, binding ring 24 has an outside diameter of about 5.5 inches, and, as previously mentioned, the outside diameter of soft, safety ring 25 is 6 inches. As best seen in Fig. 3, each punch assembly 17 is flat on one side and tapers gently on the opposite side. This taper is about 7° from horizontal.

As best shown in Figs. 2 and 3, lateral pressure resisting assembly 21, which is positioned between opposed punch assemblies 17, tapers inwardly toward the center to provide an aperture 26 in axial alignment with opposed punches 22. Assembly 21 comprises an inner annular ring 27 formed of the aforementioned Carboloy grade 44A cemented carbide and two concentric binding rings 28 and 29 formed of AISI 4142 alloy steel. Rings 28 and 29 have Rockwell C hardnesses of 50 and 40, respectively. A soft carbon steel safety ring 30 surrounds outer binding ring 29. Rings 27, 28 and 29 are slightly tapered at their contact faces so as to provide the force fit arrangement previously described in connection with punch assembly 17. The individual rings of lateral pressure resisting assembly 21 are assembled in the same manner as were the various rings of punch assembly 17.

As is best shown in Fig. 3, inner annular ring 27 has an outside diameter of about 2.4 inches, a maximum height of about 1.2 inches, and a minimum inside diameter of about 0.4 inch. Ring 27, which is substantially symmetrical about a horizontal plane, comprises portions 27a which are tapered at an angle of about 7° from horizontal, curved portions 27b, and tapered portions 27c, which taper at an angle of about 11° from the vertical. Binding ring 28 has an outside diameter of about 4.8 inches, binding ring 29 has an outside diameter of about 6.4 inches, and safety ring 30 has an outside diameter of about 6.9 inches. Lateral pressure resisting assembly 21 tapers gently from the area of ring 30 to the area of ring 27 with the taper being equal to about 7° from the horizontal.

As is best shown in Fig. 4, punches 22 and ring 27 of lateral pressure resisting assembly 21 define a controllable reaction zone in which material to be subjected to elevated pressures and temperatures is positioned. As previoulsy mentioned, Fig. 4 is a scale drawing with the faces 31 of punches 22 having a diameter of 0.350 inch. All elements in Fig. 3 conform to this scale except elements 34 and 39, whose thicknesses have been exaggerated. The specimen to be subjected to high pressure and high temperature is positioned in a hollow cylindrical reaction vessel 32, which in this specific illustration is formed of pyrophyllite. Reaction vessel 32 has a height of about 0.4 inch, an outside diameter of 0.35 inch, and an inside diameter of 0.055 inch. Pyrophyllite has been chosen as the material of construction for cylindrical reaction vessel 32 for the reasons, among others, that it is readily machinable to the desired shape and is inert to the reactants under the conditions of reaction employed in the practice of the present invention. The specimen 33 to be subjected to elevated pressures and temperatures is then positioned within the central aperture in reaction vessel 32. In this specific illustration, specimen 33 consists of a cylindrical slug 33a of preformed alloy catalyst in the central third of vessel 32 and two cylindrical slugs of graphite 33b and 33c which fill the remainder of reaction vessel 32.

The reaction vessel 32 is closed or sealed at each end by conducting metal end disks 34 which have a thickness of 0.010 inch and a diameter of 0.350 inch. The material of construction of disks 34 is unimportant to the present invention, since the function of the disks is merely to seal the reaction vessel 32 and to serve as a means of conducting current to specimen 33. Thus, any conducting metal may be employed for disks 34 which will withstand elevated temperatures and pressures. Suitable materials of construction for disks 23 are tantalum, tungsten, platinum, nickel, iron, and copper. Positioned adjacent each disk 34 is a disk 35 or pyrophyllite having a diameter of about 0.250 inch and a thickness of about 0.10 inch. An annular conducting ring 36 of AISI 4142 alloy steel having a Rockwell C hardness of 50 surrounds each of the disks 35. Ring 36 has an outside diameter of 0.350 inch and a thickness of 0.10 inch.

Inside of ring 27 of lateral pressure resisting assembly 21 and surrounding reaction vessel 32 and partially surrounding the tapered portion of each punch 22 are gasket assemblies 37, each of which comprises an inner conical pyrophyllite washer 38 having a thickness of 0.030 inch, a slant height of approximately 0.25 inch, and making an angle of 30° with the vertical. Washer 38 is surrounded by a soft carbon steel conical washer 39 having a thickness of approximately 0.010 inch and a slant height of about 0.25 inch and an angle of about 30° with respect to the vertical. Each of washers 40 has an inside diameter at its narrowest portion of 0.35 inch and an outside diameter at its narrowest portion of 0.40 inch. The 0.35 inch inner cylindrical surface of washer 40 has a height of about 0.2 inch. Washer 40 also has a tapered conical interior portion designed to cooperate with the outer surface of washer 39 and which has a taper with respect to the vertical of about 30°. The overall vertical height of washer 40 is approximately 0.43 inch and the outer surface of washer 40 is designed to conform to the shape of that portion of ring 27 with which washer 40 comes into contact.

In the operation of the high pressure-high temperature apparatus of the drawing to produce the pressures and temperatures required in the practice of the present invention, opposed recessed pistons 15 and 16 are attached respectively to pressed bed 11 and carriage 13 by any suitable means (not shown). Insulation layer 20 is then placed in the recess in piston 15 and lower punch assembly 17 is positioned in the recess in piston 15 on top of insulation layer 20. Upper punch assembly 17 is then fastened into the recess in upper recessed piston 16 by suitable means (not shown). Lower gasket assembly 37 is then positioned over lower punch 22, lower insulating disk 35 and conducting ring 36 are then positioned within lower gasket assembly 37 and conducting disk 34 is put in place. Lateral pressure resisting assembly 21 is then positioned around the parts previously assembled. Cylindrical reaction vessel 32, which contains specimen 33 is then added to the assembly. Subsequently, upper conducting disk 35 and upper conducting ring 36 are put into place. The final operation is the positioning and assembly of upper gasket assembly 37.

Reaction vessel 32 is subjected to the pressures required in the practice of the present invention by applying force to the high pressure-high temperature apparatus by means of shaft 14 of the press. The method of correlating the press load required to produce a given pressure within reaction vessel 32 is discussed below. After the desired pressure is reached the reaction vessel is brought to the desired temperature by electrical resistance heating of the specimen 33 in reaction vessel 32. Specifically, electrical current is supplied from one electrical connector, such as upper connector 19 to upper conducting ring 18, upper rings 25, 24, 23, upper punch 22, upper ring 36, upper disk 34, and to specimen 33. The electrical path from the bottom of specimen 33 to lower connector 19 is similar to the conducting path described above. After the reaction vessel has been held at the desired pressure and temperature for the desired time, the electrical current to the reaction vessel is cut off and the pressure is released. Diamonds which have been formed are then removed from the reaction vessel. The diamonds formed by the process of the present invention have been examined chemically, physically, and by X-ray crystallographic methods and are indistinguishable from those diamonds which occur in nature.

In addition to the arrangement of the carbonaceous material 33b and 33c and the preformed alloy catalyst 33a described above in the reaction vessel 32, it should be understood that many modifications of the physical form, state and location of each of these materials may be made. Thus, a wire of preformed alloy catalyst material can be located coaxially with respect to pyrophyllite cylinder 32 and a sleeve of carbonaceous material can surround the wire and fill the space between the wire and the inner wall of pyrophyllite cylinder 31. In this arrangement, the wire of preformed catalyst material is preferably in contact with disks 32 and 33 so as to establish electrical connection between the disks and thereby provide means for the resistance heating of the preformed alloy catalyst wire.

In a further modification of the specimen 33 in the reaction vessel, a hollow cylinder of preformed alloy catalyst may be placed inside of and in contact with the inner walls of pyrophyillite cylinder 31. The carbonaceous material may then be packed inside of the hollow cylinder of catalyst material.

Regardless of the particular arrangement of charge in the reaction vessel, it has been found that the conversion of carbonaceous materials to diamond is dependent solely on the pressure and temperature within the reaction vessel and is not dependent upon the particular modification employed. However, it has been found that the conversion of the present invention is much more efficient when the total supply of both preformed alloy catalyst and carbonaceous material is present in the reaction vessel in only one or two bodies. This is distinguished from employing a mixture of powders of alloy catalyst and carbonaceous material in the reaction vessel.

In preparing diamond by the method of the present invention it is difficult to measure the presure and temperature to which the reactants are subjected by direct means because of the extreme pressure employed. Therefore, each of these conditions is measured by indirect means. In measuring the pressure, recognition is made of the fact that certain metals undergo distinct changes in electrical resistance at particular pressures. Thus, bismuth undergoes a phase change which results in a change in electrical resistance at 24,800 atmospheres, thallium undergoes such a phase change at 43,500 atmospheres, cesium undergoes such a change at 53,500 atmospheres, and barium undergoes such a change at 77,400 atmospheres. I have found that the melting point of germanium varies directly with pressure over an extremely wide pressure range, including pressures up to and above 110,000 atmospheres and it is known that the electrical conductivity (and resistance) of germanium undergoes a marked change in the transition of germanium from the liquid to the solid phase. Thus, by determining the hydraulic press load necessary to cause a phase change in a metal such as bismuth a point on a pressure-press load curve is determined. By filling a reaction vessel in the Hall apparatus with germanium and applying the same press load employed to obtain the phase change in bismuth, and by then heating the germanium to the temperature at which the germanium melts (as measured by a large decrease in electrical resistivity) a point on a pressure-melting point curve for germanium is determined. By carrying this same operation out with other metals such as thallium, cesium and barium, whose phase change points are known, a series of points on a melting point-pressure curve for germanium are obtained. I have found that this melting point-pressure curve is a straight line. Therefore, by applying other press loads with the hydraulic press apparatus while the reaction chamber is filled with germanium and determining the melting point of the germanium at the different press loads, the actual pressure in the chamber at a given press load is determined. The phase changes recited for the above metals were the standards for determining the pressures employed in the practice of my invention and are the basis for the pressures recited in the appended claims.

The temperature in the reaction vessel is determined by fairly conventional means such as by placing a thermocouple junction in the reaction vessel and measuring the temperature of the junction in the usual manner. I have found that one suitable method of positioning a thermocouple in the apparatus for the measurement of temperature is to run a pair of thermocouple wires between outer pyrophyllite gasket 40 and lateral pressure resisting assembly 21. These wires then pass through the joint between upper and lower gasket assemblies 37 and through holes drilled in reaction vessel 32 with the thermocouple junction being positioned inside of the reaction vessel. When a graphite cylinder 33 is employed, the thermocouple also passes through a hole drilled through this cylinder. The material to be subjected to the elevated pressure and temperature is then compacted into the cylindrical aperture defined by reaction vessel 33 and the apparatus is assembled and subjected to a high pressure, such as a pressure of 50,000 to 100,000 atmospheres. Electrical energy at a predetermined rate is then supplied the apparatus and the temperature produced by this power is measured by the thermocouple assembly. This same procedure is repeated a number of times with different power inputs to produce a calibration curve of power input versus temperature in the reaction vessel. After calibration of the apparatus by this method, the temperature of the contents of the reaction vessel is determined by the power input to the apparatus in conjunction with the calibration curve. In general, to produce a temperature of about 1600° C. in the apparatus sepcifically illustrated, an alternating current voltage of from about 1 to 3 volts at a current up to about 800 amperes is used to deliver the required 250 to 275 watts through the contents of reaction vessel 32.

The temperature of the reaction chamber may also be determined by measuring the resistance of heating coils, such as platinum heating coils, wound around the reaction chamber. The temperature of platinum is determined from its well known temperature coefficient of resistance. Thus, the temperature within the reaction vessel is determined by relatively simple means during the course of the reaction and the pressure within the vessel is read from a plot of the relationship between the force applied by the platens of the press to the pressure within the reaction vessel.

The following examples are illustrative of the practice of my invention and are not intended for purposes of limtation. The graphite employed in these examples was either spectroscopic grade or reactor grade. In all of the examples the pressure in the reaction vessel was uniform. The temperature referred to in the examples was the hottest temperature at the interface of the preformed alloy catalyst and the carbonaceous material. It should be understood that the temperature may vary up to several hundred degrees Centigrade between spaced points in the reaction vessel and in fact the conversion appears to be facilitated by this temperature gradient.

In all of the examples, the contents of the reaction vessel were treated with fuming red nitric acid which had the effect of dissolving all of the materials in the product except diamond. The diamond formed in the examples was examined by at least one of the following methods to make sure that the product formed was actually diamond: X-ray crystallography, refracitve index, density, chemical analysis, infrared analysis, and hardness tests.

In all of the examples the diamonds were formed at the interface (or interfaces) between the preformed alloy catalyst and the carbonaceous material.

Example 1

This example illustrates the use of a preformed alloy of 80 percent nickel and 20 percent chromium in the conversion of graphite to diamond. In this example the specific apparatus and reaction vessel and specimen arrangement of Figs. 2 to 4 was employed with the single exception that vessel 32 had an inside diameter of 0.180 inch. The central third of the bore of pyrophyllite cylinder 32 was filled with a cylindrical slug of the preformed alloy. The remainder of the volume defined by the inner wall of pyrophyllite cylinder 32 was filled with cylindrical slugs of spectroscopic graphite. Diamonds were formed at the interfaces between the alloy and the graphite when this assembly was subjected to a pressure of about 63,000 atmospheres at a temperature of about 1500° C. for three minutes. Diamonds were also formed at the interfaces when similar assemblies were subjected to the following conditions.

| Approximate Pressure, Atm. | Approximate Temperature, °C. | Time, Minutes |
|---|---|---|
| 63,000 | 1,400 | 3 |
| 70,000 | 1,400 | 3 |
| 70,000 | 1,600 | 3 |
| 85,000 | 1,400 | 3 |
| 100,000 | 1,400 | 3 |
| 100,000 | 2,100 | 1/3 |

The diamonds formed above at a pressure of 70,000 atmospheres and a temperature of 1400° C. were measured in white light and found to have a refractive index in the range of 2.40 to 2.50. The refractive index of natural diamond chips, examined simultaneously, also lay in the range of 2.40 to 2.50. X-ray diffraction patterns obtained by diamonds prepared in this run were obtained by taking a Debye-Scherrer photograph in a cylindrical camera of 5 cm. radius with CuK$_a$ radiation. This diffraction pattern showed overwhelmingly that diamonds had been formed. The interplanar spacings ($d$ in Augstrom units) measured from these photographs are compared with the theoretical values for diamonds in the table below.

| Plane | Interplanar Spacing ($d$ in Angstrom Units) | |
|---|---|---|
| | Measured | Natural Diamond |
| (111) | 2.05 | 2.05 |
| (220) | 1.26 | 1.262 |
| (311) | 1.07 | 1.076 |
| (400) | 0.890 | 0.8920 |
| (330) | 0.818 | 0.8185 |

*Example 2*

The procedure of Example 1 was repeated except that other preformed nickel-chromium alloys were used as catalysts. The table below lists the weight percent of nickel in the alloys, and the pressure, temperature and time of reactions in which diamonds were formed.

| Percent Nickel | Approximate Pressure, Atm. | Approximate Temperature, °C. | Time, Minutes |
|---|---|---|---|
| 70 | 87,000 | 1,600 | 3 |
| 70 | 100,000 | 1,500 | 3 |
| 95 | 65,000 | 1,600 | 3 |
| 95 | 90,000 | 1,500 | 3 |
| 98 | 70,000 | 1,550 | 3 |

*Example 3*

Following the procedure of Example 1, except with preformed nickel-manganese alloys as catalysts, diamonds were formed under the conditions listed in the table below.

| Percent Nickel | Approximate Pressure, Atm. | Approximate Temperature, °C. | Time, Minutes |
|---|---|---|---|
| 40 | 70,000 | 1,600 | 10 |
| 40 | 80,000 | 1,500 | 3 |
| 40 | 90,000 | 1,300 | 17 |
| 40 | 100,000 | 1,400 | 7 |
| 50 | 87,000 | 1,300 | 13 |
| 50 | 91,000 | 1,500 | 14 |
| 70 | 87,000 | 1,400 | 3 |
| 70 | 87,000 | 1,800 | 3 |
| 96 | 65,000 | 1,400 | 9 |
| 96 | 85,000 | 1,600 | 3 |

*Example 4*

Following the procedure of Example 1, graphite was converted to diamond employing a preformed alloy of equal parts by weight of iron and manganese in place of the alloy of Example 1. This reaction was carried out at a pressure of about 75,000 atmospheres and a temperature of about 1700° C.

*Example 5*

This example illustrates the use of various alloys of nickel and iron as catalysts in the conversion of graphite to diamond. The procedure employed was that of Example 1. The table below lists the weight percent nickel in the nickel-iron alloy, the pressure of the reaction, the temperature of the reaction, and the time the reaction mixture was held under the reaction conditions.

| Percent Nickel | Approximate Pressure, Atm. | Approximate Temperature, °C. | Time, Minutes |
|---|---|---|---|
| 8 | 81,000 | 1,550 | 15 |
| 8 | 93,000 | 1,850 | 3 |
| 16 | 81,000 | 1,600 | 15 |
| 16 | 93,000 | 1,500 | 13 |
| 25 | 81,000 | 1,400 | 20 |
| 30 | 63,000 | 1,300 | 3 |
| 30 | 90,000 | 1,450 | 3 |
| 30 | 90,000 | 1,700 | 3 |
| 33 | 75,000 | 1,300 | 11 |
| 33 | 90,000 | 1,400 | 6 |
| 33 | 90,000 | 1,700 | 5 |
| 35 | 71,000 | 1,500 | 8 |
| 35 | 93,000 | 1,750 | 5 |
| 67 | 81,000 | 1,600 | 10 |
| 90 | 75,000 | 1,400 | 6 |
| 90 | 85,000 | 1,500 | 3 |

*Example 6*

This example illustrates the use of a preformed alloy of a catalyst metal and a non-catalyst metal in the conversion of graphite to diamond. In each of the runs of this example, a pyrophyllite cylinder with a cylindrical bore had its center filled with a cylindrical slug of spectroscopic carbon with a preformed nickel-copper alloy being employed as cylindrical slugs on either side of the graphite slug. This assembly was then sealed with either tantalum or nickel end disks and subjected to various pressures and temperatures. In all cases, diamonds were formed at the interface between the graphite and the alloy. The table below lists the weight percent of nickel in the alloy, the pressure employed and temperature employed, and the time of each run.

| Percent Nickel | Approximate Pressure, Atm. | Approximate Temperature, °C. | Time, Minutes |
|---|---|---|---|
| 15 | 86,000 | 1,600 | 14 |
| 20 | 86,000 | 1,600 | 13 |
| 30 | 86,000 | 1,600 | 8 |
| 30 | 100,000 | 2,000 | 3 |
| 33 | 86,000 | 1,600 | 9 |
| 40 | 86,000 | 2,000 | 8 |
| 40 | 98,000 | 2,050 | 4 |
| 50 | 86,000 | 1,300 | 14 |
| 50 | 96,000 | 2,000 | 3 |
| 57 | 86,000 | 1,500 | 9 |

*Example 7*

The procedure of Example 6 was repeated with the various preformed copper-manganese alloys used to convert graphite to diamond. The results appear in the table below.

| Percent Copper | Approximate Pressure, Atm. | Approximate Temperature, °C. | Time, Minutes |
|---|---|---|---|
| 50 | 75,000 | 1,300 | 12 |
| 50 | 87,500 | 1,200 | 13 |
| 50 | 92,000 | 1,200 | 14 |
| 50 | 92,000 | 1,700 | 8 |
| 65 | 83,000 | 1,300 | 11 |
| 65 | 91,000 | 1,300 | 7 |
| 83.3 | 92,000 | 1,350 | 3 |

*Example 8*

Following the procedure of Example 1, graphite was converted to diamond employing a number of different preformed binary alloy catalysts. The table below lists the weight percentage composition of each alloy and the pressure, temperature and time employed.

| Alloy Composition | Approximate Pressure, Atm | Approximate Temperature, °C. | Time, Minutes |
|---|---|---|---|
| 95 Ni—5 Ti | 65,000 | 1,450 | 5 |
| 95 Ni—5 Ti | 70,000 | 1,550 | 3 |
| 95 Ni—5 Ti | 90,000 | 1,500 | 3 |
| 95 Ni—5 Zr | 80,000 | 1,750 | 2.5 |
| 90 Ni—10 Mo | 70,000 | 1,400 | 6 |
| 70 Ni—30 Mo | 87,000 | 1,600 | 3 |
| 50 Ni—50 Ge | 77,500 | 1,600 | 6 |
| 70 Ni—30 Co | 87,000 | 1,600 | 3 |
| 70 Ni—30 Co | 100,000 | 1,300 | 3 |
| 50 Ge—50 Mn | 84,000 | 1,600 | 8 |
| 50 Ge—50 Mn | 91,000 | 1,300 | 11 |
| 33 Ge—67 Mn | 92,000 | 1,950 | 12 |
| 90 Co—10 Cr | 80,000 | 1,700 | 3 |
| 50 Sn—50 Mn | 91,000 | 1,350 | 12 |
| 50 Ag—50 Mn | 92,000 | 1,650 | 8 |
| 50 Cr—50 Ge | 86,000 | 1,600 | 7 |
| 50 Fe—50 Ge | 86,000 | 1,400 | 17 |
| 50 Fe—50 Ge | 86,000 | 1,800 | 7 |

*Example 9*

Following the procedure of Example 1, preformed alloys of more than two metals were used as catalysts to convert graphite to diamond. The table below lists the weight percentage composition of the alloy and the pressure, temperature and time employed.

| Alloy Composition | Approximate Pressure, Atm | Approximate Temperature, °C. | Time, Minutes |
|---|---|---|---|
| 54 Fe—28 Ni—18 Co | 90,000 | 1,500 | 11 |
| 54 Fe—28 Ni—18 Co | 97,000 | 1,400 | 3 |
| 54 Fe—28 Ni—18 Co | 100,000 | 1,700 | 13 |
| 66 Fe—30 Ni—4 Cr | 55,000 | 1,300 | 9 |
| 66 Fe—30 Ni—4 Cr | 65,000 | 1,350 | 6 |
| 66 Fe—30 Ni—4 Cr | 80,000 | 1,600 | 3 |
| 74 Fe—18 Ni—8 Cr | 90,000 | 1,600 | 6 |
| 90 Ni—5 Cr—5 Mn | 65,000 | 1,450 | 3 |

Since diamonds prepared by the method of this invention are indistinguishable from natural diamonds, they have the same utility as natural diamonds, e.g., gems for use in jewelry and other ornamental articles, and industrial uses such as in the cutting edge of a glass cutter, the abrasive ingredient in abrasive wheel formulations, etc.

What I claim as new and desire to secure by Letters Patent of the United States is:

1. In the process for making diamonds by heating a carbonaceous material at elevated temperatures and pressures, the improvement which comprises effecting the conversion of the carbonaceous material to diamond at a pressure of at least about 50,000 atmospheres in the presence of an alloy of a metal which is a catalyst for the aforesaid conversion reaction, the said metal being selected from the class consisting of iron, cobalt, nickel, ruthenium, rhodium, palladium, osmium, iridium, platinum, chromium, tantalum and manganese.

2. The method of claim 1 in which the carbonaceous material is a non-diamond carbon.

3. The method of claim 1 in which the carbonaceous material is graphite.

4. The method of claim 1 in which the catalyst is a preformed alloy of nickel and chromium.

5. The method of claim 1 in which the catalyst is a preformed alloy of nickel and manganese.

6. The method of claim 1 in which the catalyst is a preformed alloy of iron and manganese.

7. The method of claim 1 in which the catalyst is a preformed alloy of iron and nickel.

8. The method of claim 1 in which the catalyst is a preformed alloy of nickel and copper.

9. The method of claim 1 in which one of the metals in said alloy is nickel.

10. The method of making diamond which comprises (1) defining a reaction zone, (2) positioning in said reaction zone a mixture of non-diamond carbon and a catalyst comprising a preformed alloy of at least two metals, one of said metals being a member selected from the class consisting of iron, cobalt, nickel, ruthenium, rhodium, palladium, osmium, iridium, platinum, chromium, tantalum, and manganese, (3) subjecting said mixture to an elevated pressure of at least about 50,000 atmospheres and an elevated temperature of at least about 1200° C. in the diamond stable region to catalyze the diamond forming reaction, said pressure and temperature being selected to be in the range in which said catalyst is operative, (4) maintaining said pressure and temperature until said non-diamond carbon is converted to diamond, (5) removing said mixture from said reaction zone, and (6) recovering the diamonds formed from said mixture.

11. The method of converting a carbonaceous material to diamond which comprises (1) defining a substantially cylindrical reaction zone, (2) positioning in said reaction zone alternating bodies of carbonaceous material and a catalyst operative above certain minimums of pressure and temperature in the diamond stable region to catalyze the diamond forming reaction, said pressure and temperature being, respectively, at least about 50,000 atmospheres and at least about 1200° C., said catalyst comprising a preformed alloy of at least two metals, one of said metals being a member selected from the class consisting of iron, cobalt, nickel, ruthenium, rhodium, palladium, osmium, iridium, platinum, chromium, tantalum, and manganese, (3) subjecting said alternating bodies to a pressure and temperature in the range in which said catalyst is operative until said carbonaceous material is converted to diamond, (4) removing from said reaction zone the composition present therein and (5) recovering the diamonds formed.

12. The method of making diamonds which comprises (1) confining in an inert container a mixture of carbonaceous material and a catalyst operative at a pressure of at least about 50,000 atmospheres and at a temperature of at least 1200° C. in the diamond stable region to catalyze the diamond forming reaction, said catalyst comprising a preformed alloy of at least two metals, one of said metals being a member selected from the class consisting of iron, cobalt, nickel, ruthenium, rhodium, palladium, osmium, iridium, platinum, chromium, tantalum, and manganese, (2) subjecting said mixture to a pressure of at least 50,000 atmospheres and a temperature of at least 1200° C., said pressure being selected to be in the range in which the catalyst is operative, (3) removing said mixture from said inert container after said carbonaceous material has been converted to diamond and (4) recovering the diamond formed from said mixture.

References Cited in the file of this patent

FOREIGN PATENTS 377,239  Great Britain _____ July 21, 1932

OTHER REFERENCES

Parsons: "Phil. Trans. of the Royal Society," Series A, pp. 67–77, 92–101 (1919).

Gunther et al.: "Z. Anorg. Allgem. Chem.," vol. 250, pp. 357–372 (1943).

Bridgman: "J. of Chem. Physics," vol. 15, No. 2, pp. 92–98, February 1947.

D. P. Mellor: "Research," vol. 2, No. 7, pp. 314–318, July 1949.

Henry: Washington, D.C., "Evening Star," page A–3, Feb. 15, 1955.

Neuhaus: "Angew. Chem.," vol. 66, pp. 525–536, Sept. 7, 1954.

Mellor: "Comprehensive Treatise on Inorganic and Theoretical Chemistry," vol. 5, pp. 734, 736, 737 (1924), Longmans, Green & Co.

(Other references on following page)

OTHER REFERENCES

Hershey: "Trans. Kansas Acad. Sci.," vol. 40, pp. 109–111 (1937).

Kuss: "Chemie Ingenieur Technik," vol. 28, No. 3, pp. 141–152, March 1956.

Liander: "A.S.E.A. Journal," vol. 28, pp. 97, 98, May–June 1955.

Peiser et al.: "X-Ray Diffraction by Polycrystalline Materials," pp. 500–501 (1955), The Institute of Physics, London.

Henry et al.: "The Interpretation of X-Ray Diffraction Photographs," pp. 219, 221 (1951), Macmillan and Co., Ltd., St. Martins St., London.

Azaroff et al.: "The Powder Method," page 1 (1958), McGraw-Hill Book Co., N.Y.